United States Patent
Ruf

(10) Patent No.: US 7,028,293 B2
(45) Date of Patent: Apr. 11, 2006

(54) CONSTANT RETURN OPTIMIZATION TRANSFORMING INDIRECT CALLS TO DATA FETCHES

(75) Inventor: Erik S. Ruf, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 564 days.

(21) Appl. No.: 09/822,535

(22) Filed: Mar. 30, 2001

(65) Prior Publication Data

US 2002/0174418 A1 Nov. 21, 2002

(51) Int. Cl.
G06F 9/45 (2006.01)
(52) U.S. Cl. .................. 717/152; 717/116; 717/159
(58) Field of Classification Search .......... 717/140, 717/151, 152, 154, 156, 157, 165, 116, 159
See application file for complete search history.

(56) References Cited

U.S. PATENT DOCUMENTS

| | | | | |
|---|---|---|---|---|
| 5,421,016 A | * | 5/1995 | Conner et al. | 717/146 |
| 5,481,708 A | * | 1/1996 | Kukol | 717/155 |
| 5,794,044 A | * | 8/1998 | Yellin | 717/139 |
| 5,970,242 A | * | 10/1999 | O'Connor et al. | 717/100 |
| 6,041,179 A | * | 3/2000 | Bacon et al. | 717/116 |
| 6,044,155 A | * | 3/2000 | Thomlinson et al. | 713/155 |
| 6,161,217 A | * | 12/2000 | Detlefs et al. | 717/141 |
| 6,163,880 A | * | 12/2000 | Ramalingam et al. | 717/104 |
| 6,175,956 B1 | * | 1/2001 | Hicks et al. | 717/114 |

OTHER PUBLICATIONS

Karen Driesen, "Selector Table Indexing & Sparse Arrays", Oct. 1993, Proceedings of the ACM OOPSLA'93 Conference, Washington DC.*
Urs Hölzle, Craig Chambers, David Ungar, "Optimizing Dynamically-Typed Object-Oriented Languages With Polymorphic Inline Caches", 1991, Springer-Verlag Heidelberg, Lecture Notes in Computer Science, ISSN: 0302-9743, vol. 512 / 1991, pp. 21-38.*
Gerald Baumgartner, Vincent F. Russo, "Implementing signatures for C++", Jan. 1997, ACM Transactions on Programming Languages and Systems (TOPLAS), vol. 19 Issue 1, pp. 153-187.*

(Continued)

Primary Examiner—Tuan Dam
Assistant Examiner—J. Derek Rutten
(74) Attorney, Agent, or Firm—Merchant & Gould P.C.

(57) ABSTRACT

Indirect method invocation of methods that only return constant values is optimized using fetching operations and return constant tables. Such method calls can be optimized if all possible method calls via the call site instruction return a constant value and have no side effects. Each constant return value is loaded from a return constant table, and method invocation is eliminated. If all possible target methods in a program result in a constant return value and have no side effects, an associated virtual function dispatch table (vtable) may be used as the return constant table. Furthermore, control operation optimization may be applied to identify type constraints, based on one or more possible type-dependent constant return values from an indirect method invocation. An optimizer identifies and maps between a restricted set of values and an associated restricted set of types on which execution code may operate relative to a given control operation. The type constraints are used to optimize the associated execution code by filtering propagation of runtime type approximations for optimization.

21 Claims, 9 Drawing Sheets

OTHER PUBLICATIONS

Zaks, Feldman, and Aizikowitz, "Sealed calls in Java packages", 2000, Proceedings of the 15th ACM SIGPLAN conference on Object-oriented programming, systems, languages, and applications, ISSN:0362-1340, pp. 83-92.*

Bradley M. Kuhn, David W. Binkley, "An enabling optimization for C++ virtual functions", Feb. 1996, Proceedings of the 1996 ACM symposium on Applied Computing, pp. 420-428.*

Driesen and Hölzle, "The direct cost of virtual function calls in C++", 1996, Proceedings of the 11th ACM SIGPLAN conference on Object-oriented programming, systems, languages, and applications, ISSN:0362-1340, pp. 306-323.*

David F. Bacon, Peter F. Sweeney, "Fast static analysis of C++ virtual function calls", Oct. 1996, Proceedings of the 11th ACM SIGPLAN conference on Object-oriented programming, systems, languages, and applications, vol. 31 Issue 10, pp. 324-341.*

Eric Amiel, Olivier Gruber, Eric Simon, "Optimizing multi-method dispatch using compressed dispatch tables", Oct. 1994, Proc. of the ninth annual conference on Object-oriented programming systems, language, and applications, 29 Issue 10, pp. 244-258.*

Steven S. Muchnick, "Advanced Compiler Design and Implementation", 1997, Morgan Kaufmann Publishers, ISBN 1-55860-320-4, Chapter 19.*

Bacon, Graham, and Sharp, "Compiler Transformations for High-Performance Computing", Dec. 1994, ACM Computing Surveys, Volumn 26, No. 4, pp. 345-420.*

Kayshav Dattatri, "C++: Effective Object-Oriented Software Construction", 2000, Prentice Hall, Chapter 13.*

G. Ramalingam, Harini Srinivasan, "A member lookup algorithm for C++", May 1997, ACM SIGPLAN Notices, Proceedings of the ACM SIGPLAN 1997 conference on Programming language design and implementation, vol. 32 Issue 5, pp.: 18-30.*

Paul McNamee, Marty Hall, "Developing a tool for memoizing functions in C++", Aug. 1998, ACM SIGPLAN Notices, vol. 33 Issue 8, ISSN:0362-1340, pp.: 17-22.*

Mark Johnson, "Squibs and discussions: Memoization in top-down parsing", Sep. 1995, Computational Linguistics, vol. 21 Issue 3, ISSN:0891-2017, pp.: 405-417.*

Hall and Mayfield, "Improving the Performance of AI Software: Payoffs and Pitfalls in Using Automatic Memoization", Sep. 1993, Proceedings of Sixth International Symposium on Artifical Intelligence, 7 pages.*

Brad Calder, Dirk Grunwald, "Reducing indirect function call overhead in C++ programs", 1994, Proceedings of the 21st ACM SIGPLAN-SIGACT symposium on Principles of programming languages, ISBN:0-89791-636-0, pp.: 397-408.*

"SableVM: A Research Framework for the Efficient Execution of Java Bytecode", Sable Technical Report No. 2000-3, by Gagnon et al., Nov. 2000.

"Chapter 10: Virtual Methods", http://topaz.cs.byu.edu/cs431/doc/Textbook/Chapter10/, 21 pages.

* cited by examiner

CONSTANT RETURN OPTIMIZATION TRANSFORMING INDIRECT CALLS TO DATA FETCHES

TECHNICAL FIELD

The invention relates generally to program code optimization, and more particularly to optimizing indirect invocation of methods that return constant values.

BACKGROUND OF THE INVENTION

Modern software developers often develop software programs initially in a source code format. Thereafter, a compiler typically processes the source code to generate an executable program in an intermediate language code or executable code format. A compiler may also compile intermediate language code into an executable code format. A translation from one format to another provides the opportunity to introduce optimizations into the resulting code. For example, the compiler can examine the source code and modify the code to use computer resources more efficiently or to provide better runtime performance.

One of the more expensive runtime operations in object oriented languages is referred to as "indirect method invocation", through which a method call site may call one of several possible methods. The selection of which method is actually called is deferred until runtime and depends on the runtime type of the receiver object. For example, consider the type hierarchy 100 shown in FIG. 1, which has an abstract parent class "Statement" 102 having virtual methods: (1) getName( ) and (2) getKind( ). "Type" is a generalization of "class," "interface," etc. The parent type "Statement" 100 has an abstract child type "Effect" 104 and a concrete child type "Control" 106. The type "Effect" 104 has two concrete child types "Assignment" 108 and "SideEffect" 110. The methods getName( ) and getKind( ) for each of the concrete types return constant values and have no side effects. Also, the method addKindPlusOne( ) of SideEffect 110 also returns a constant value.

With regard to the type hierarchy of FIG. 1, indirect method invocation relates to execution of exemplary code:
(1) Statement stmt=. . . ;
(2) String s=stmt.getName( );

CODE EXAMPLE 1

An Indirect Call Site

At compile-time, the compiler cannot resolve which target method, i.e., Assignment.getName( ), SideEffect.getName( ), or Control.getName( ), to select for execution because, at runtime, any object of type Assignment 108, SideEffect 110, or Control 106 may be validly assigned to the receiver object stmt. Therefore, the selection of which target method to call is deferred until runtime and is based on the runtime type of the object assigned to receiver object stmt.

At runtime, for example, a typical indirect invocation implementation based on virtual function tables (vtables) may execute five operations: (1) a load operation to obtain the vtable pointer of receiver object stmt; (2) a load operation to obtain the target method address from the vtable; (3) an indirect branch to the target method address; (4) a load operation to put the constant return value (e.g., "Assignment", "SideEffect", or "Control") into the result register; and (5) a return operation. A sixth instruction may also be needed to copy the returned value into the appropriate register or stack slot. While such overhead may be acceptable when the called method returns a non-constant value or involves side effects, the overhead undesirably dominates indirect invocation of a method that merely returns a constant and has no side effects.

SUMMARY OF THE INVENTION

Embodiments of the present invention solve the discussed problems by optimizing indirect method invocation of methods that return constants.

In an implementation of the present invention, a method of optimizing indirect method invocation at a call site is provided. The call site is associated with a receiver object. The call site is also programmed to call a target method of a plurality of possible target methods. The target method is associated with the receiver object. It is determined that the possible target methods return constants and have no side effects. A return constant table is generated in association with the receiver object. The return constant table has an entry associated with a constant return value of the target method of the receiver object. An optimized instruction is generated in association with the call site to retrieve via the return constant table the constant return value associated with the target method.

In another implementation of the present invention, a compiler for optimizing indirect method invocation at a call site is provided. The call site is associated with a receiver object. The call site is also programmed to call a target method of a plurality of possible target methods that return constant values. The target method is associated with the receiver object. A constant return optimizer generates a return constant table associated with the receiver object. The constant return optimizer also generates an optimized instruction in association with the call site to retrieve via the return constant table a constant return value associated with the target method.

In other implementations of the present invention, articles of manufacture are provided as computer program products. One embodiment of a computer program product provides a computer program storage medium readable by a computer system and encoding a computer program for executing a computer process that optimizes indirect method invocation at a call site. Another embodiment of a computer program product may be provided in a computer data signal embodied in a carrier wave by a computing system and encoding the computer program that optimizes indirect method invocation at a call site.

The computer program product encodes a computer program for executing on a computer system a computer process for optimizing indirect method invocation at a call site is provided. The call site is associated with a receiver object. The call site is also programmed to call a target method of a plurality of possible target methods that return constant values. The target method is associated with the receiver object. A return constant table is generated having an entry associated with a constant return value of the target method of the receiver object. An optimized instruction is generated in association with the call site to retrieve via the return constant table the constant return value associated with the target method.

These and various other features as well as other advantages, which characterize the present invention, will be apparent from a reading of the following detailed description and a review of the associated drawings.

DETAILED DESCRIPTION OF THE INVENTION

Figure 1:
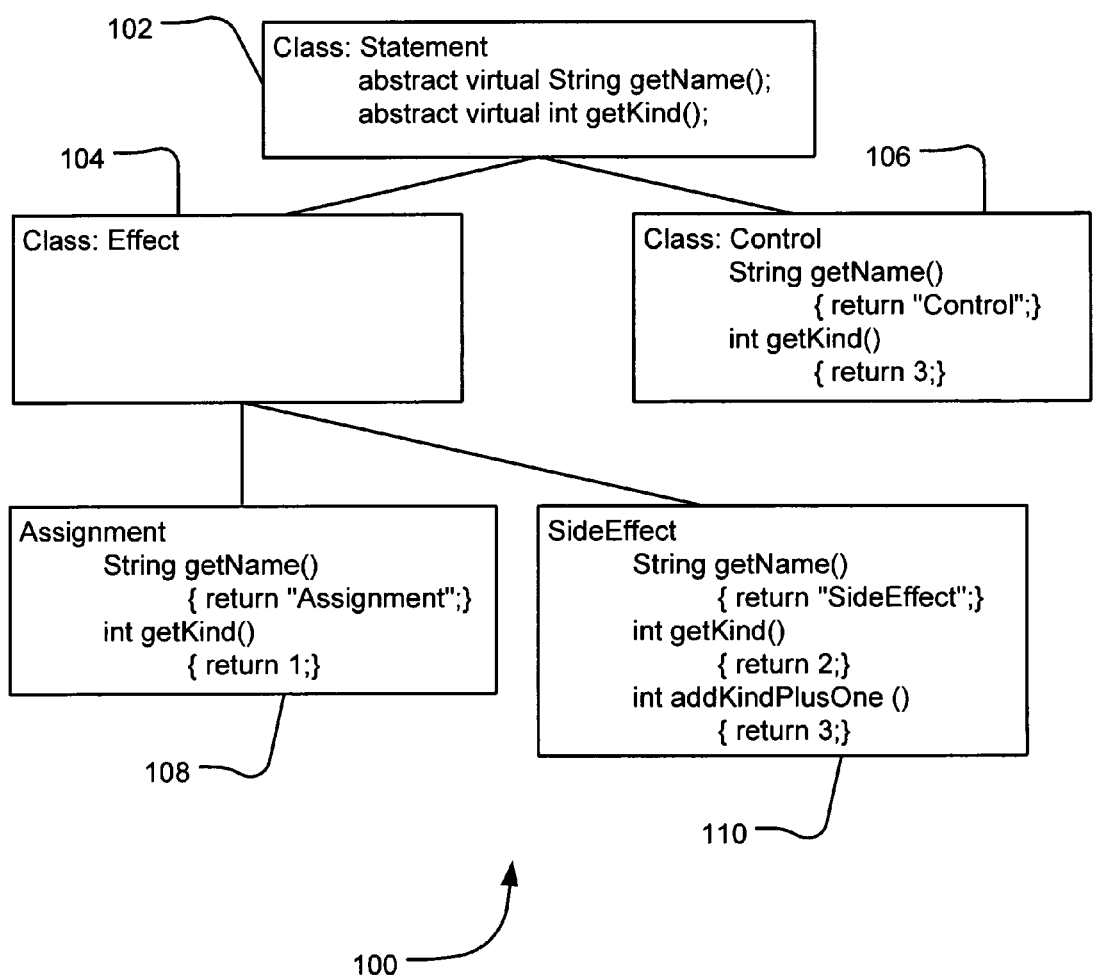
FIG. 1 depicts an exemplary class hierarchy including methods that return constants.

An embodiment of the present invention includes a code optimizing module, possibly as part of a compiler, that optimizes target program code implementing indirect invocation of a method. If the possible target methods return constant values and involve no side effects, the indirect invocation associated with the methods may be "transformed" (e.g., replaced by a table lookup of the constant return value), dramatically reducing the number of instructions required for the call site's operation. The term "side effect" refers to an operation that changes the state of a process or object that is external to the method, excluding the return operation itself.

A "call site" refers to a code representation of a method call (e.g., String s=stmt.getName( )). The code optimizing module can determine whether the call site is singly-bound or multiply-bound. "Singly-bound" indicates that the call site has only one target method (e.g., a call site that calls SideEffect.addKindPlusOne( )), which can be called through direct method invocation. "Multiply-bound" indicates that the call site has multiple possible target methods (e.g., Assignment.getName( ), SideEffect.getName( ), or Control.getName( )), which are called through indirect method invocation.

Because a singly-bound call site invokes only a single method, the code optimizing module can evaluate the call site at compile time, and if the call site is bound to a single constant-returning method that has no side-effects, the code optimizing module can replace the "call" instruction with an instruction that fetches the appropriate constant return value. Therefore, during execution, instead of calling the original target method, the optimized execution code implements the call site by fetching the constant return value (e.g., by using an inline load operation that stores the constant value 3 into s).

The case of a multiply-bound call site is more complex. A multiply-bound call site is bound to multiple possible methods, but the identity of which bound method is actually called during execution (or, therefore, which constant to fetch) cannot be determined at compile-time. Instead, the identity of the target method which is actually called during runtime is based on a property (e.g., the type) of the receiver object associated with the call site, which is not known until runtime. Therefore, the simple optimization that is applied to singly-bound call sites is inadequate for multiply-bound call sites. Instead, in an embodiment of the present invention, a constant return optimizer generates one or more return constant tables that store constant return values in association with the multiple possible target methods that are callable from a multiply-bound call site. In addition, fetching instructions are generated to retrieve the appropriate constant return value from the return constant table, as part of the optimized code. As such, the return constant table and the fetching instructions implement operations to retrieve the appropriate constant return value without actually calling one of the bound target methods.

Figure 2:
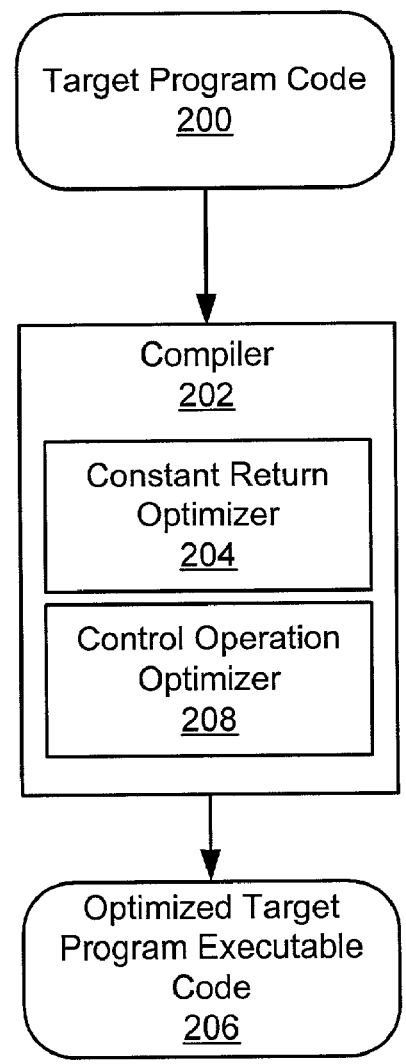
FIG. 2 illustrates a constant return optimizer in an embodiment of the present invention.

FIG. 2 illustrates a constant return optimizer in an embodiment of the present invention. Target program code 200 may be in the form of any program code that may be compiled and optimized. For example, a compiler 202 may be a source code compiler having a constant return optimizer module 204 or a control operation optimization module 208 for optimizing code in an embodiment of the present invention. In an alternative embodiment, however, the compiler 202 may be an intermediate language compiler or a Just-In-Time (JIT) compiler for compiling intermediate language code. In yet another embodiment, although not specifically depicted in FIG. 2, the optimizers 204 and 208 may be stand-alone software modules (i.e., independent of the compiler). Furthermore, the optimizers 204 and 208 may be employed independently, so that one or the other optimizer may be omitted within the scope of the present invention. Optimized target program executable code 206 is generated from either of the optimizers 204 and 208 or a combination thereof to include optimized structures and instructions, such as modified vtables, separate return constant tables, and/or optimized code relating to fetching operations and/or control operations.

Figure 3A:
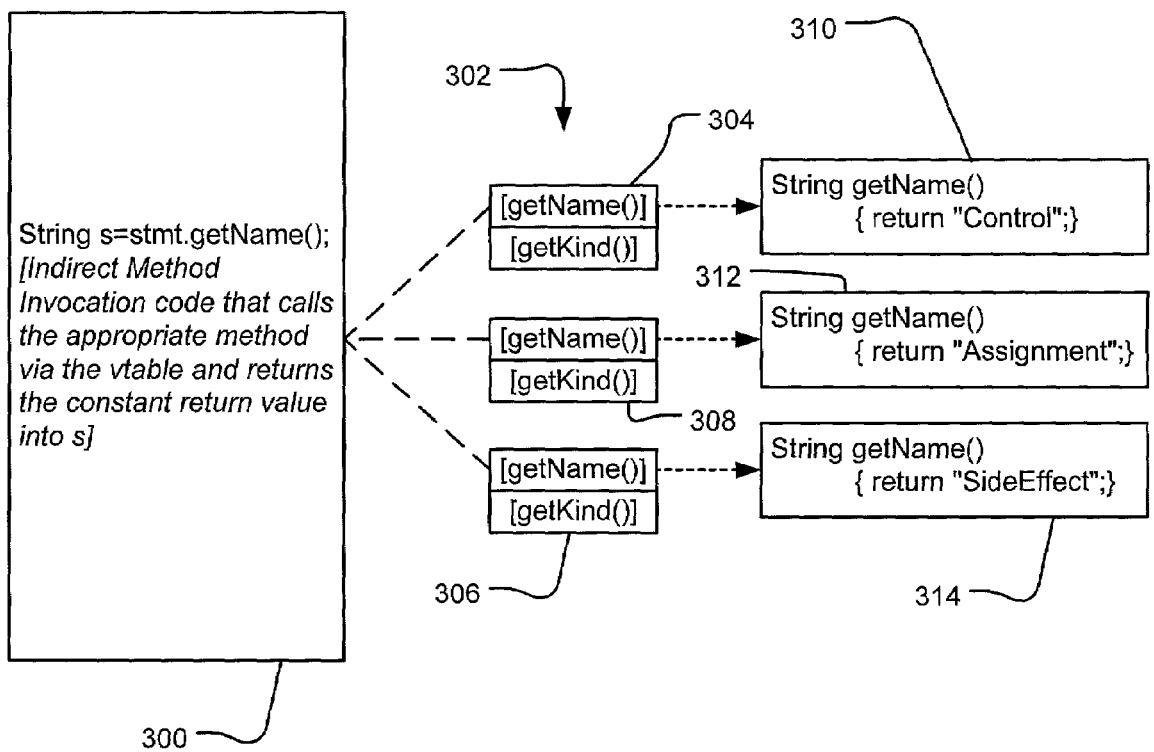
FIG. 3A illustrates indirect method invocation of a multiply-bound call site in a first stage of an embodiment of the present invention.

FIG. 3A illustrates indirect method invocation of a multiply-bound call site in a first stage of an embodiment of the present invention. Program code 300 represents code of a target program. The program code 300 includes a multiply-bound call site associated with the instruction "String s=stmt.getName( );", where receiver object stmt is declared as a type Statement. As part of a compilation or optimization process, the call site instruction is translated into intermediate language or executable code that implements indirect method invocation at the call site during execution (see italics in FIG. 3A). Each of the vtables 302 is associated with one of the types Assignment, Control, and SideEffect. The indirect method invocation code identifies an appropriate vtable (e.g., in accordance with the receiver object's type) and identifies the appropriate vtable entry that corresponds to the getName( ) method.

Based on the type hierarchy illustrated in FIG. 1, receiver object stmt may be defined as type Control, Assignment, or SideEffect during execution. In an embodiment of the present invention, the receiver object stmt contains a reference to a vtable associated with the receiver object's particular type. Each of the vtables 302 of FIG. 3A contains a reference to one of the target methods. Each vtable is illustrated as having an entry for a reference to the appropriate getName( ) method (i.e., as denoted by the entry containing "[getName( )]") and an entry for a reference to the appropriate getKind( ) method (i.e., as denoted by the entry containing "[getKind( )]"). A vtable 304 includes a reference to the Control.getName( ) method 310. A vtable 308 includes a reference to the Assignment.getName( ) method 312. A vtable 306 includes a reference to the SideEffect.getName( ) method 314. It should be understood that the entries containing "[getKind( )]" reference appropriate getKind( ) target methods (not shown). By following the reference from the receiver object stmt to the appropriate vtable and indexing to the entry associated with the call site's selector name, indirect method invocation code can call the proper target method during runtime, based on the type of the receiver object stmt.

As discussed, however, because the target methods are constant-returning and have no side effects, the processing illustrated in FIG. 3A may be optimized in an embodiment of the present invention. A look-up table, referred to as a "return constant table", may be used (instead of the simple inline "load" optimization used for singly-bound call sites) to store the set of possible constant return values in association with a property (e.g., the type) of the receiver object and the index of the original target method. In one embodiment, a return constant table is associated with a given receiver object type. An entry in the return constant table is allocated in correspondence with each target method to store the corresponding constant return value or reference thereto (i.e., associating the entry with the constant return value). In addition, optimizing instructions for fetching the appropriate constant return value via the return constant table are also added to the code as an optimization, instead of the original indirect method invocation code. Fetching may be performed directly, as in retrieving the constant return value from the return constant table entry, or indirectly, as in retrieving the constant return value by following a table-stored reference (e.g., a pointer) to the constant return value.

Figure 3B:
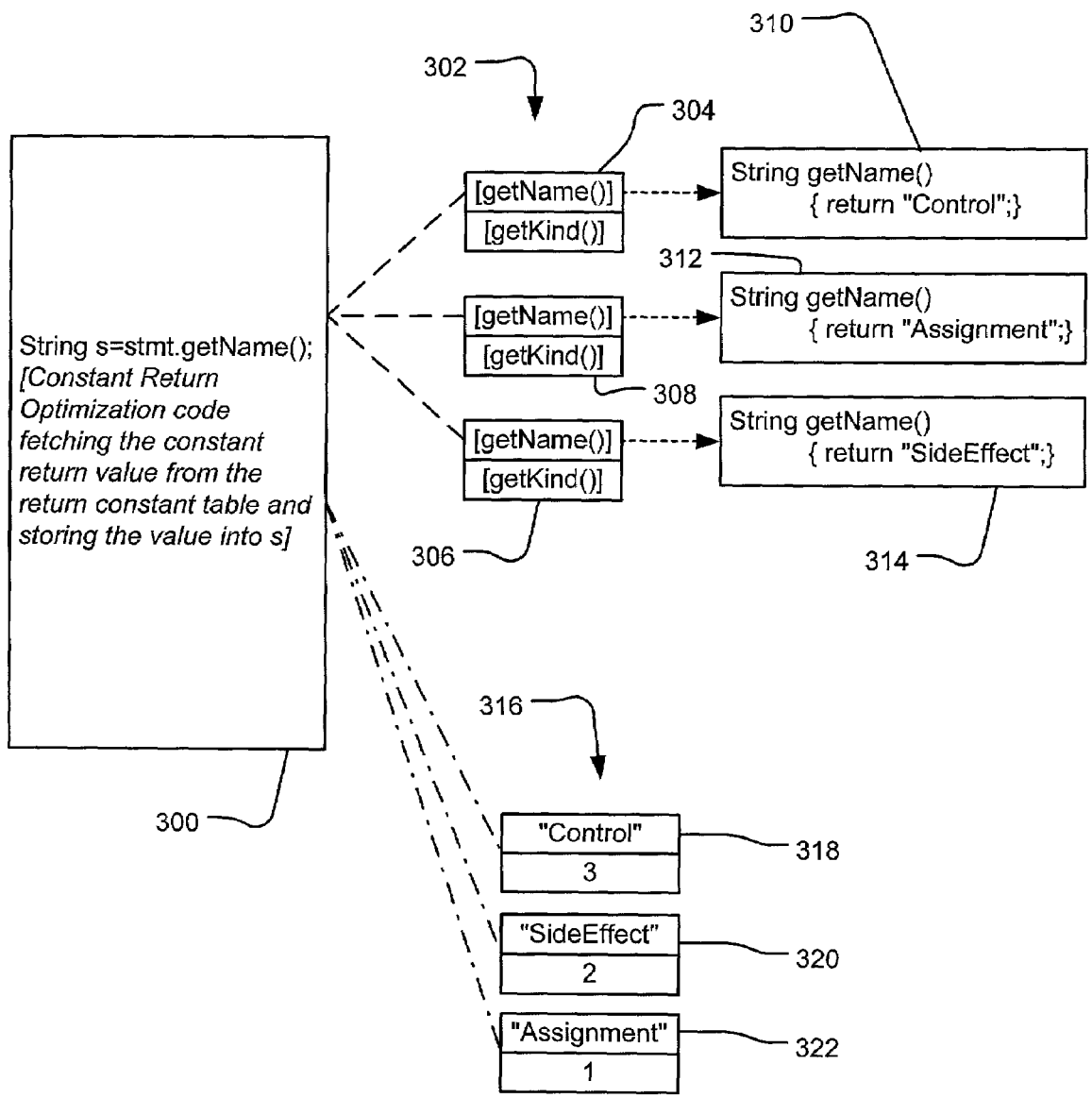
FIG. 3B illustrates indirect method invocation of a multiply-bound call site combined with constant return optimization in a second stage of an embodiment of the present invention.
Figure 4:
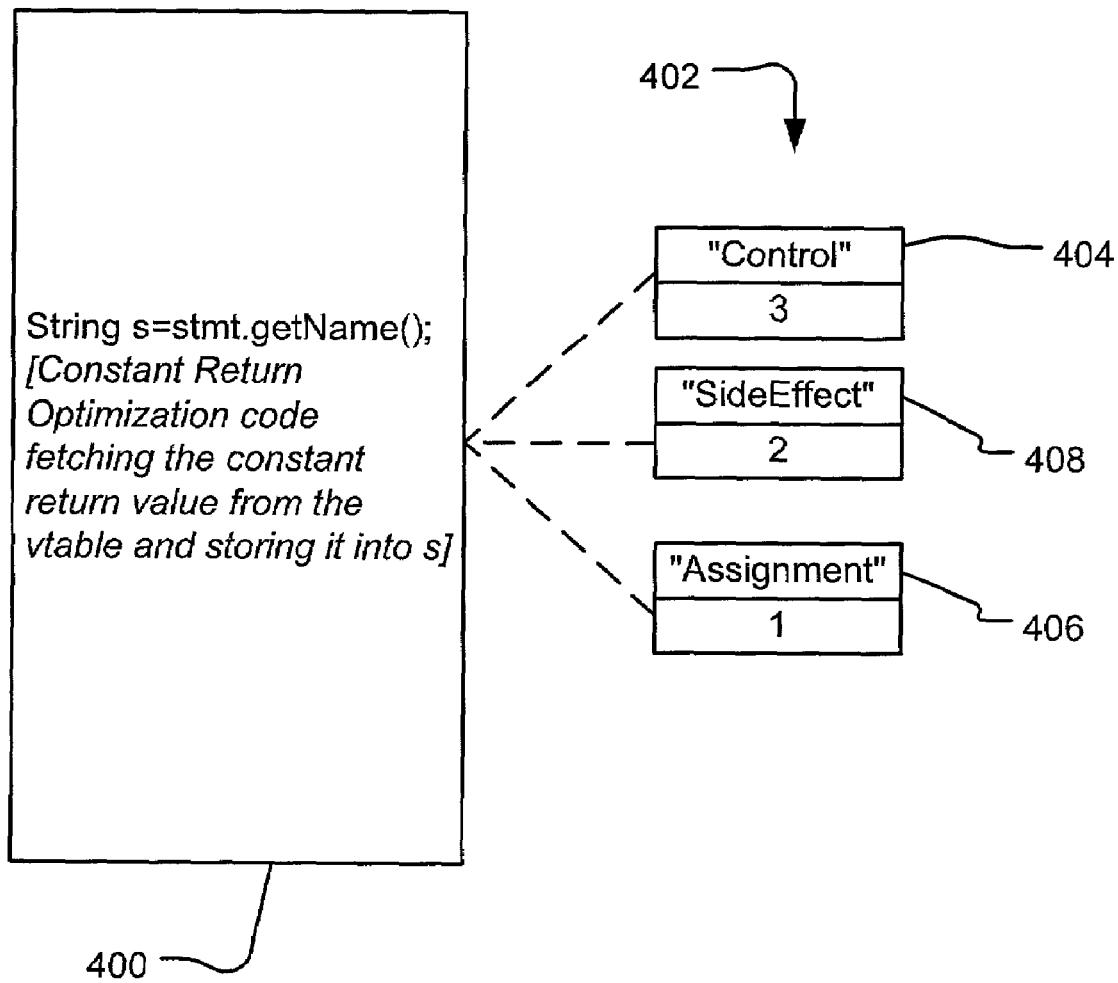
FIG. 4 illustrates constant return optimization using a dispatch table as a return constant table in an embodiment of the present invention.

FIG. 3B illustrates indirect method invocation of a multiply-bound call site combined with constant return optimization in a second stage of an embodiment of the present invention. It should be understood, however, that no dependency or order requirement necessarily exists between the stages show in FIG. 3A and 3B. Instead, FIGS. 3A and 3B are intended to show the independence of the vtables and return constant tables in one embodiment of the present inventions. Nevertheless, in an alternative embodiment (e.g., as shown in FIG. 4), the vtables and return constant tables may be combined if certain conditions exist. Furthermore, vtables and return constant tables may be generated and populated in any order, and either one of the vtable or return constant table generation and population operations may be omitted or modified within the scope of the present invention.

Program code 300 represents code of a target program. The program code 300 includes a multiply-bound call site associated with the instruction "String s=stmt.getName( );", where receiver object stmt is declared as a type Statement. As part of the compilation or optimization process, the call site instruction is translated into intermediate language or executable code that implements constant return optimization using a return constant table (see italics in FIG. 3B). Based on the type hierarchy illustrated in FIG. 1, stmt may be defined as type Control, Assignment, or SideEffect. Each of the vtables 302 is associated with one of the types Assignment, Control, and SideEffect. A vtable 304 includes a reference to the Control.getName( ) method 310. A vtable 308 includes a reference to the Assignment.getName( ) method 312. A vtable 306 includes a reference to the SideEffect.getName( ) method 314. By following the reference to the appropriate vtable and indexing to the appropriate entry within the vtable, indirect method invocation code can call the proper target method during runtime, based on the type of the receiver object stmt.

However, the constant return optimizer can evaluate the target methods and determine that each of them is constant-returning and has no side effects. If each target method of a call site is constant-returning and has no side effects, the call site may deemed "transformable". Therefore, the constant return optimizer can generate return constant tables 316, which also have entries 318, 320, and 322 allocated to each target method of the possible receiver objects (e.g., the target methods associated with a virtual method). However, in contrast to the vtable 302, the return constant tables 316 contain the constant return values or references thereto for each receiver object type. In one embodiment, a return constant table may include constant return values entries associated with each target method of a receiver object, whether the entries are populated or not. In an alternative embodiment, a return constant table may be configured differently, such as only including populated constant return values entries associated with constant-returning methods having no side effects. Such entries in both cases may include the constant return values themselves or references thereto. In addition, the constant return optimizer can also generate constant return optimization instructions instead of indirect method invocation instructions, such as one or more instructions associated with the call site to fetch the constant return value from the appropriate entry in the return constant tables 316.

In order to optimize a multiply-bound call site in one embodiment, the call site must be bound only to constant-returning methods that have no side effects. That is, the optimizing instructions (i.e., the fetch instructions) must work for all possible methods callable from the call site. Otherwise, if the constant return optimizing instructions that merely fetch the constant return value from the look up table (instead of branching execution to the method) are inserted into the program code during optimization (replacing the indirect method invocation instructions), then indirect invocation of a non-constant returning method will never execute properly for that call site. As such, all target methods callable from an optimized call site must be constant-returning and have no side effects in order for constant return optimization to be applied in an embodiment of the present invention.

Alternatively, it is possible to apply this condition programmatically during runtime, although this approach is likely to defeat the anticipated performance gains of constant return optimization. Nevertheless, the optimizer could generate optimized code that, during execution, determines whether the target method of a given receiver object returns a constant value and has no side effects (e.g., by testing a compiler-generated flag). If so, the optimized code fetches the return value from the appropriate return constant table (whether separate from the vtable or not). Otherwise, the optimized code indirectly invokes the appropriate target method. Such an implementation represents an alternate embodiment of the present invention.

The return constant table allows the constant return optimized code to decrease the number of operations required to execute a statement (e.g., "String s=stmt.getName( );", where the possible target methods are constant-returning and have no side effects. As previously explained, a typical indirect invocation implementation based on virtual function tables executes five operations. In contrast, implementation of the same call site can be reduced to two or three operations using constant return optimization: (1) a load operation to obtain stmt's return constant table pointer, and (2) a load operation to obtain the constant return value from the return constant table, based on the return constant table pointer. Another store operation into the stack may also be required if s is not held in a register. The constant return optimization saves an indirect branch operation, an immediate load operation, and a return operation (and possibly a copy operation), as well as the code space for the multiple target method bodies. However, as described above, the constant return optimization may require a new data structure (i.e., a return constant table) for each receiver object type having constant-returning target methods that lack side effects.

FIG. 4 illustrates constant return optimization using a dispatch table as a return constant table in an embodiment of the present invention. In this alternative embodiment, virtual function tables (i.e., types of dispatch tables that may exist because of an indirect method invocation implementation) are altered to re-use the table entries previously allocated to store target method addresses. Alternatively, any form of dispatch table, such as a table indexed by receiver type and method, may be employed. As discussed above, these target method addresses are no longer required to return the constant return values, which are now merely fetched from entries in a return constant table. Accordingly, under certain conditions, appropriate entries in a receiver object's vtable may be used to store the constant return values, thereby alleviating the additional space of a separate return constant table. In other words, the corresponding entries in the respective vtables can form the return constant table.

One additional condition this vtable approach introduces is a limit on the size of each constant return value that may be fetched from a vtable entry to a call site. That is, the size of the constant return value may not exceed the length of the vtable entry. For example, in a system having 32-bit memory addressing, an optimized call site cannot call a method returning a double-precision floating point value (64-bits long).

Vtables are associated with the type (e.g., the Assignment, Control, or SideEffect type) of a given receiver object. As such, the same vtable is typically employed for all receiver objects of the same type throughout the program. Therefore, another additional condition this vtable approach may introduce is that all target methods that are optimizable using the vtable approach must be invoked only from singly-bound or transformable call sites within the program. If a given constant-returning method may be called from a non-transformable call site somewhere else in the program, the vtable for the associated receiver object may not be used to hold entries of the return constant table because at least one call site in the program requires the target method address to be included in the vtable for indirect method invocation.

Program code 400 represents executable code of a target program. Program code 400 represents code of a target program. The program code 400 includes a multiply-bound call site associated with the instruction "String s=stmt.getName( );", where receiver object stmt is declared as a type Statement. As part of a compilation or optimization process, the call site instruction is translated into intermediate language or executable code that implements constant return optimization using a vtable as a return constant table (see italics in FIG. 4). Based on the type hierarchy illustrated in FIG. 1, stmt can be defined as type Control, Assignment, or SideEffect. Appropriate entries in a vtable 402 of FIG. 4 contain a constant return value or a reference thereto. An entry 404 includes the constant literal string "Control". An entry 408 includes the constant literal string "Assignment". An entry 406 includes the constant literal string "SideEffect". Therefore, the appropriate constant may be fetched in accordance with the type of the receiver object stmt.

Figure 5:
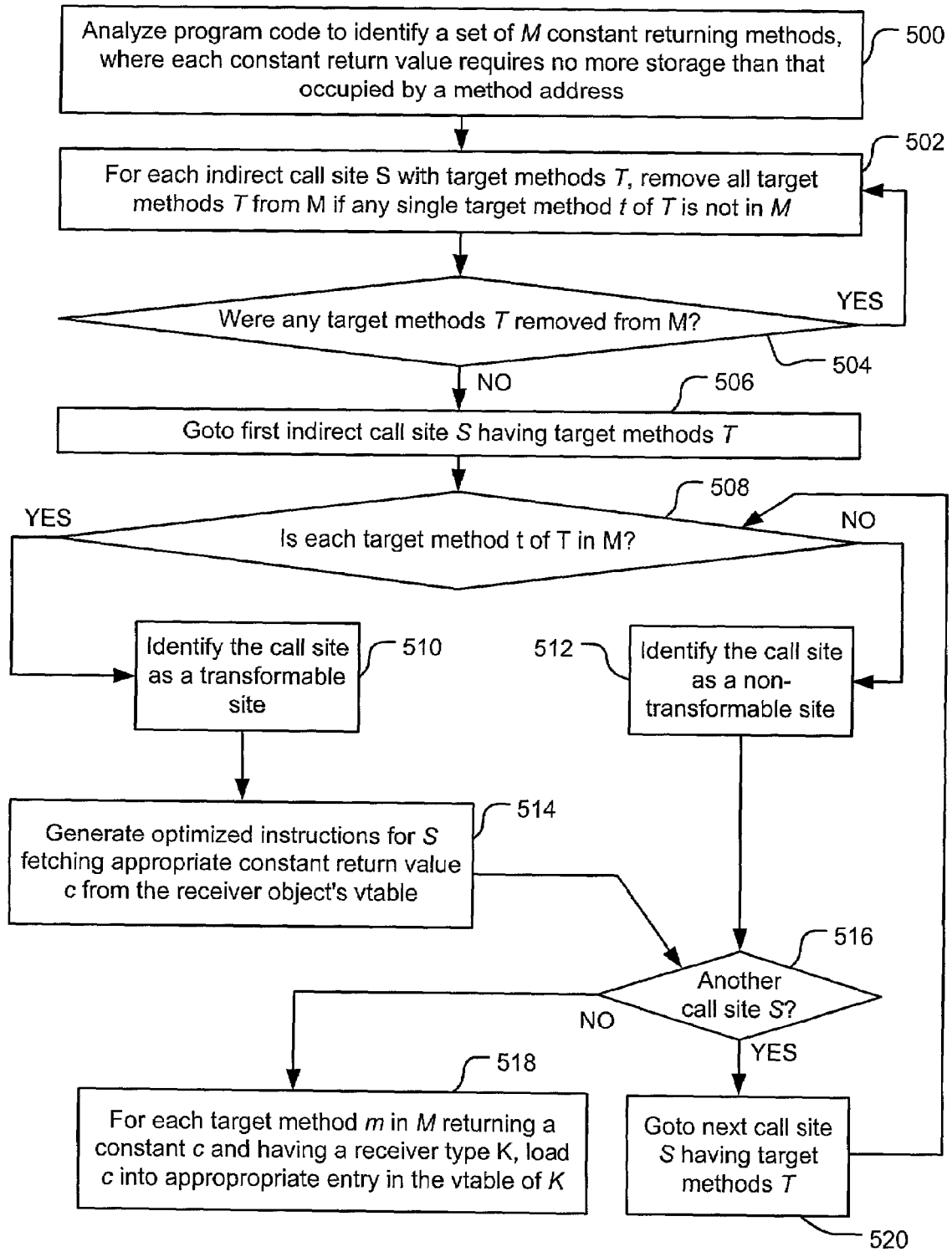
FIG. 5 illustrates operations for constant return optimization involving vtables in an embodiment of the present invention.

FIG. 5 illustrates operations for constant return optimization involving vtables in an embodiment of the present invention. An analysis operation 500 analyze program can identify a set of M constant returning methods. These methods also have constant return values that require no more storage than that occupied by a method address. A filtering operation 502 traverses through each indirect call site S. Each indirect call site S is associated with a set of target methods T, where each target method in the set T is represented by t. It should be understood that each target method t may be a member in one or more sets T because each target method t may be called from more than one call site S in a program.

During its traversal of indirect call sites, the filtering operation 502 removes from set M all target methods of a set T that has at least one target method member t not in set M. That is, if any T includes a target method member t that is not in set M, then the entire set T is removed from set M. Because removal of a target method t may affect other sets T associated with other call sites S, a conditional operation 504 determines whether any target methods removed from set M. If so, processing returns to filtering operation 502. Otherwise, processing proceeds to an initiating operation 506.

The initiating block 506 starts a traversal process at a first indirect call site S, which has a set of target methods T A conditional operation 508 determines whether the current indirect call site S is transformable. A transformable call site is characterized by a set of target methods T in which each target method member t has no side effects and is in the set M. An identification operation 510 identifies the call site S as a transformable site, or an identification operation 512 identifies the call site S as a non-transformable site, based on the results of the conditional operation 508. If the call site S is identified as non-transformable, processing proceeds from identification operation 512 to conditional operation 516, which determines whether another indirect call site S exist in the program. If the call site S is identified as transformable, an instruction generation operation 514 generates optimized instructions for the call site S. The optimized instructions cause the call site S to fetch the appropriate constant return value c from a runtime receiver object's vtable, rather than the default behavior of calling the appropriate target method using a target method address in the receiver object's vtable. Processing then proceeds to the conditional operation 516.

If another indirect call site S exists within the program, a traversal operation 520 traverses to the next indirect call site S and sends processing to the conditional operation 508 for additional optimization. Otherwise, all appropriate call sites S have been optimized, and a table loading operation 518 configures the appropriate return constant tables to support the optimization. The table loading operation 518 traverses through each target method m in set M, where m returns a constant value c and has receiver type K. During the traversal for each target method, the table loading operation 518 loads c into the appropriate entry in the vtable of type K. It should be understood that the table loading operation 518 may actually replace a target method address in the vtable or may be performed in combination with the compiler-related operations that generate indirect method invocation, such that either target method addresses or return constants are loaded into the vtable, depending on the results of the target method is in set M.

In an alternative embodiment of the present invention, the traversal operations 502 and 504 may be accomplished in a single pass by constructing equivalence classes of methods reachable from a common call site, and making the transformable/non-transformable decision per equivalence class instead of per call site. Implementing the equivalence relation with union-find data structures avoids the need for the loop operation 504 and simplifies the test in operation 508.

Figure 6:
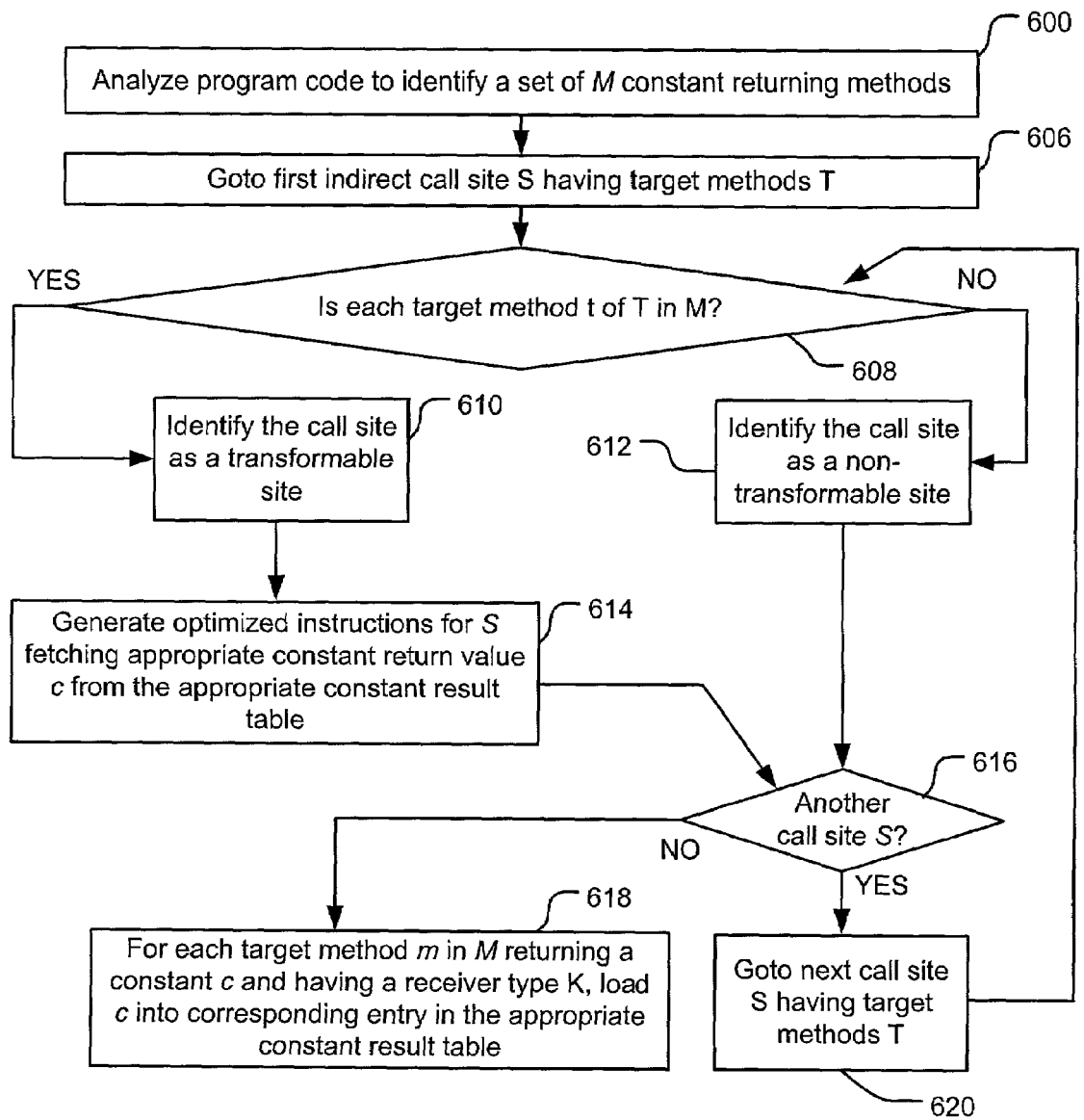
FIG. 6 illustrates operations for constant return optimization involving separate return constant tables in an embodiment of the present invention.

FIG. 6 illustrates operations for constant return optimization involving separate return constant tables in an embodiment of the present invention. An analysis operation 600 can identify a set of M constant returning methods. In this embodiment of the present invention, the constant return values are not bounded by the storage allotted to target method addresses because a separate return constant table is employed.

An initiating block 606 starts a traversal process at a first indirect call site S, which has a set of target methods T A conditional operation 608 determines whether the current indirect call site S is transformable. A transformable call site is characterized by a set of target methods T in which each target method member t has no side effects and is in the set M. An identification operation 610 identifies the call site S as a transformable site, where has an identification operation 612 identifies the call site S as a non-transformable site, based results of the conditional operation 608. If the call site S is identified as non-transformable, processing proceeds from identification operation 612 to conditional operation 616, which determines whether another indirect call site S exist in the program. If the call site S is identified as transformable, an instruction generation operation 614 generates optimized instructions for the call site S. The optimized instructions cause the call site S to fetch the appropriate constant return value c from a separate return constant table associated with the runtime receiver object. Processing then proceeds to the conditional operation 616.

If another indirect call site S exists within the program, a traversal operation 620 traverses to the next indirect call site S and sends processing to the conditional operation 608 for additional optimization. Otherwise, all appropriate call sites S have been optimized, and a table loading operation 618 configures the appropriate return constant tables to support the optimization. The table loading operation 618 traverses through each target method m in set M, where m returns a constant value c and is a method of type K. During the traversal for each target method, the table loading operation 618 loads c into the appropriate entry in the return constant table of type K.

The size of set M in this embodiment generally equals or exceeds the size of set M in the embodiment of FIG. 5 because no filtering operation is employed. The use of a separate return constant table (as opposed to a vtable) alleviates the condition that all indirect invocations of a given target method be made from a transformable call site in order to qualify for optimization. However, in yet another embodiment of the present invention, the methods of FIGS. 5 and 6 may be combined (e.g., functionally merged or executed sequentially) so that target methods globally associated with transformable call sites may be optimized using a vtable method (i.e., a method such as shown in FIG. 5) whereas those target methods that are only locally associated with one or more transformable call site may be optimized using a separate return constant table method (i.e., a method such as shown in FIG. 6).

It should be understood that no order dependence is implied with respect to any operations of FIGS. 5 and 6 unless specifically indicated by the description of the process.

In a particular style of programming, constant-returning methods are frequently used in combination with control operations. For example, the following example code includes an indirect call site with a control-dependent type test:

```
(1)    Statement stmt = . . . ;
(2)    int kind = stmt.getKind();
(3)    switch (kind) {
(4)        case 1: . . . ((Assignment)stmt) . . . ; break;
(5)        case 2: . . . ((SideEffect)stmt) . . . ; break;
(6)        case 3: . . . ((Control)stmt) . . . ; break;
(7)        default: throw new BadKindException(kind);
(8)    }
```

CODE EXAMPLE 2

An Indirect Call Site with Control Dependent Type Tests

In Code Example 2, the control operation switch( ) in line (3) includes a control variable kind as an input parameter and is associated with control targets case 1, case 2, case 3, and default with associated instructions in lines (4)–(7).

The indirect call to stmt.getKind( ) returns an integer constant, which is then used by an appropriate control target instruction to downcast stmt to an appropriate subtype before executing functions specific to the subtype. In an embodiment of the present invention, the downcast instruction includes two components: (1) a compile time check to make sure the downcast type can be applied to the declared type of stmt; and (2) a dynamic runtime check that throws an exception if the runtime type of the stmt object is incompatible with the downcast operation.

While the constant return optimizations discussed above may be used to remove the overhead of the indirect method invocation, the control-dependent type test may also be optimized as a result of the constant return optimization. A correspondence between the possible constant result values of the stmt.getKind( ) instruction and the switch construct's case constants may be used to limit or narrow the possible conditions for a given control construct, thereby allowing unnecessary instructions to be omitted in optimization.

For example, in Code Example 2, the dynamic type test (i.e., the downcast) associated with ((Assignment)stmt) can be eliminated because the call stmt.getKind( ) returns the constant value '1' only when the type of its receiver object stmt of type Assignment. Therefore, the runtime check portion of the downcast operation may be eliminated. Likewise, an analogous optimization can be made for the code blocks associated with case statements '2' and '3'. Furthermore, because the call stmt.getKind( ) can only result in a constant value equally '1', '2', or '3', the default code block may also be eliminated, as it will never be executed. Accordingly, by understanding the (narrowed) set of possible values which may be applied to a given control operation (e.g., the switch( ) statement), the operations associated with the control operation may be optimized.

It should be understood that constant return optimization may be one possible method of narrowing the set of possible values that can be applied to a given control operation, other narrowing optimizations may also be employed within the scope of the present invention, even without constant return optimization. For example,

```
(1)   Statement
(2)        abstract int getArgCount();
(3)        abstract String getName();
(4)
(5)   Effect extends Statement
(6)        abstract int getArgCount();
(7)
(8)   Assignment extends Effect
(9)        int getArgCount() { return 2; }
(10)       String getName() { ... }
(11)
(12)  SideEffect extends Effect
(13)       int getArgCount() { return 1; }
(14)       String getName() { ... }
(15)
(16)  Control extends Statement
(17)       int argCount;
(18)       int getArgCount() { return this.argCount; }
(19)       String getName() { ... }
(20)
(21)  Statement stmt = ...
(22)  int argCount = stmt.getArgCount();
(23)  if (argCount == 0) {
(24)       String s = stmt.getName();
(25)  }
```

CODE EXAMPLE 3

Control Dependent Type Tests without Constant Return Optimization

In Code Example 3, the control operation in line 23 includes a control variable argCount. The call to stmt.getArgCount( ) on line 22 is not optimized using constant return optimization because the target method on line 18 is not constant returning. However, a control operation optimizer can identify that control variable argCount cannot equal a value other than '0'. Therefore, the compiler can deduce a compile time that the indirect invocation on line 24, which represents a control target, can be resolved to the direct invocation of the method Control.getName( ).

Figure 7:
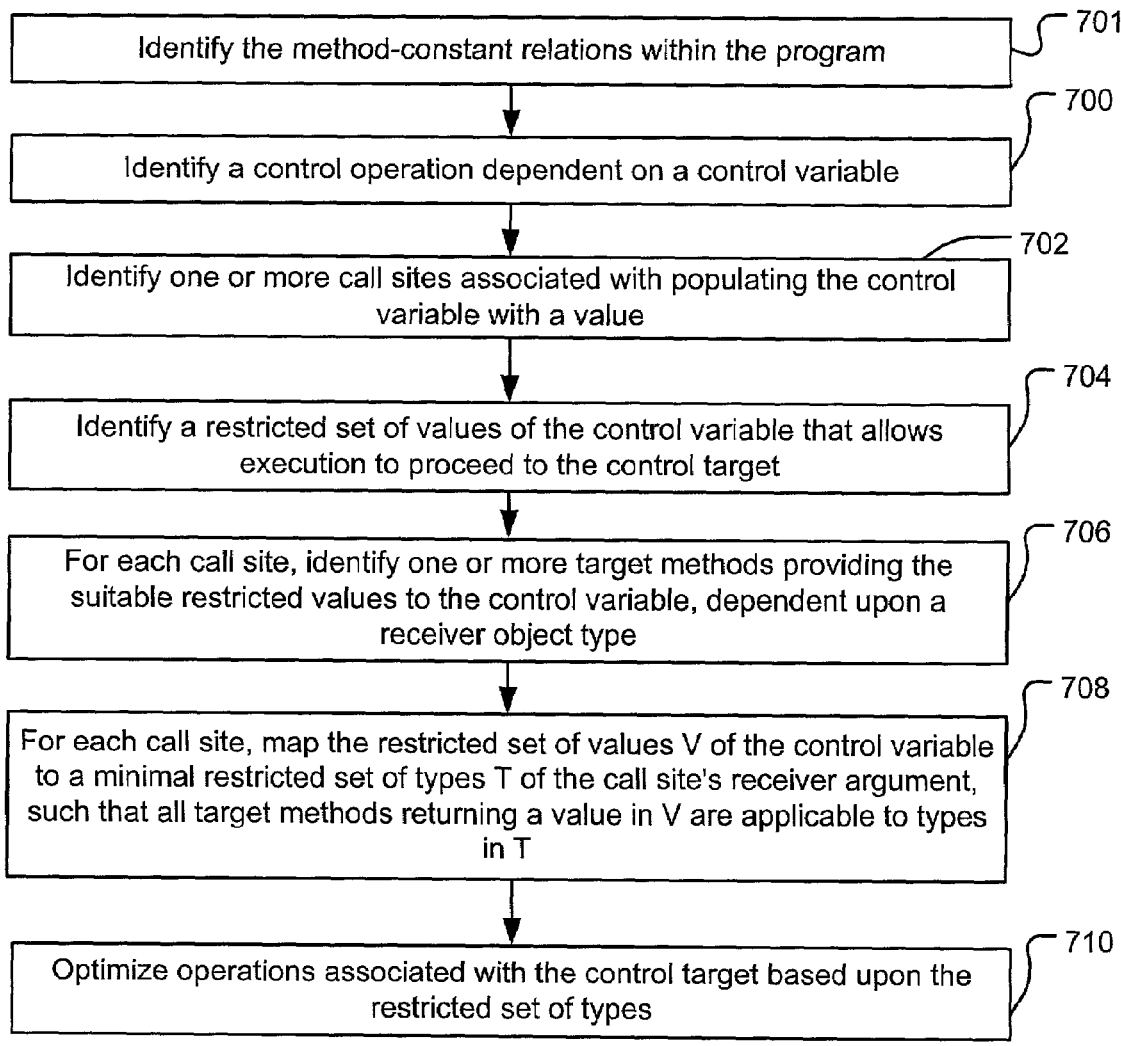
FIG. 7 illustrates operations for optimizing a control operation in an embodiment of the present invention.

FIG. 7 illustrates operations for optimizing a control statement in an embodiment of the present invention. An identification operation 701 identifies the relationships between various target methods and their return constants, such as that described with respect to constant return optimization. Another identification operation 700 identifies a control operation that is dependent on a control variable. In Code Example 2, an exemplary control operation switch( ) is dependent on control variable kind and is associated with the control targets, which are indicated by the case statements. It should be understood, however, that other control operations, including if-then-else operations and while operations, are also contemplated within the scope of the present invention.

Identification operation 702 identifies one or more indirect call sites that result in the control variable being populated by one or more values. For example, one or more assignment operations or computations within the program flow may be associated with the control variable and value loaded therein. In one embodiment of the present invention, multiple assignment operations relating to the control variable may be evaluated to trace the origin of the value.

An identification operation 704 analyzes the program flow (such as using call graph analysis) to identify values of the control variable that can result in execution of the control target. This analysis results in identification of a restricted set of values of the control variable that may exist at the control statement. The restricted set of values may be in the form of a single value. Alternatively, the restricted set of values may result from a set operation (e.g., intersection or union). For example, if the analysis of program flow indicates that only two possible values of the control variable would result in execution of a given control target, the control operation optimizer can use the union of these two possible values to perform optimization of the associated control targets, such as optimization based on a restricted set of receiver object types.

It should be understood that no order dependence is implied with respect to any operations of FIG. 7 unless specifically indicated by the description of the process. For example, in an alternative embodiment of the present invention, the operations 702 and 704 may be reversed in the order shown in FIG. 7 without departing from the scope of the present invention.

An identification operation 706 identifies one or more target methods that provide the suitable set of restricted values to the control variable. In an embodiment of the present invention, the identity of the target method may be dependent upon a receiver object type and indirect method invocation. Furthermore, the identity of the target method may be accomplished by identifying the constant return values (i.e., those associated with a given target method and receiver object via a return constant table or another method-constant relationship) that are members of the restricted set of values.

Identification of the restricted set of values also identifies the type of the receiver objects that may return members of the restricted set. As such, a restricted set of value of a control variable can correspond to a restricted set of types associated with the control variable. According, a mapping operation 708 maps between the restricted set of values identified in identification operation 704 and a restricted set of types of the receiver object.

An optimization operation 710 generates optimized instructions relating to the control target based upon the restricted set of types corresponding to individual values of the control variable. As shown with regard to Code Example 2, for example, the runtime check portions of downcast operations in the control targets may be omitted for appropriate case statements and the default control target code may also be omitted, based on the restricted set of types for each operation.

It should also be understood that some optimizations may not result in a single type per value of control variable. For example, in addition to the types illustrated in FIG. 1, another type may exist within the hierarchy having a non-constant target method that can return any integer between '1' and '3' inclusively (i.e., an example of a "union" operation forming the restricted set of values). In an embodiment of the present invention, based on the Code Example 2, the default operation may nevertheless be omitted because no type may be called that can return a value other than '1', '2', and '3'. This embodiment, therefore, may provide control operation optimization based on the restricted sets of values and types, even if constant return optimization is not employed.

Figure 8:
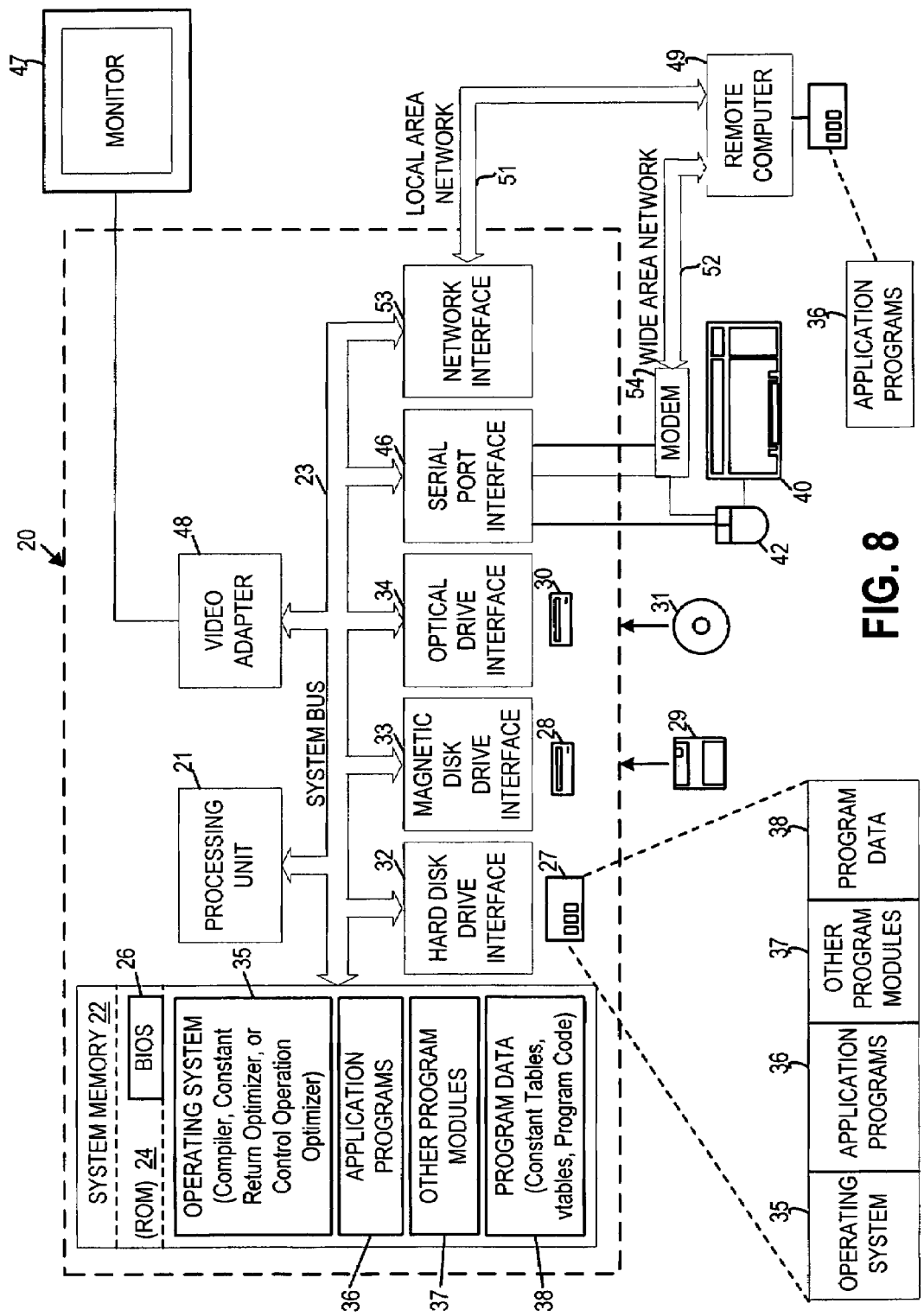
FIG. 8 illustrates an exemplary system useful for implementing an embodiment of the present invention.

The exemplary hardware and operating environment of FIG. 8 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a compiler, a constant return optimizer, or a control operation optimizer may be incorporated as part of the operating system 35, application programs 36, or other program modules 37. Return constant tables, vtables, and program code may be stored as program data 38.

In an embodiment of the present invention, a compiler, a constant return optimizer, or a control operation optimizer is incorporated as part of the operating system 35. The compiler, the constant return optimizer, or the control operation optimizer is incorporated, in other embodiments, in the application programs 36. In still other embodiments, the compiler, the constant return optimizer, or the control operation optimizer is incorporated in the other program modules 37. Return constant tables, vtables, and program code are stored, in some embodiments, as program data 38.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer program product including at least one tangible medium encoding an object-oriented computer program for executing on a computer system a computer process for optimizing indirect method calls, the indirect method call being programmed to call a target method of a plurality of possible target methods that return constant values the computer process comprising:

determining the association between the indirect method call and a receiver object and between the indirect method call and a target method;

determining the association between the target method and a return constant value and between the target method and the receiver object;

generating, at compile time and before invoking the indirect method call, a return constant table having an entry associated with the return constant value of the target method of the receiver object; and generating, at compile time, before invoking the indirect method call, an optimized instruction to retrieve, without executing a function, via the return constant table the return constant value associated with the target method.

2. The computer program product of claim 1 wherein the operation of generating a return constant table comprises:
   inserting the constant return value associated with the target method into a dispatch table associated with the receiver object, wherein the dispatch table includes the return constant table.

3. The computer program product of claim 1 wherein the operation of generating a return constant table comprises:
   inserting the constant return value associated with the target method into a return constant table, the return constant table being independent of a dispatch table associated with the receiver object.

4. The computer program product of claim 3 wherein the operation of generating a return constant table further comprises:
   associating the return constant table with the receiver object.

5. The computer program product of claim 1 wherein the operation of generating a return constant table comprises:
   determining that the target method is not callable from a non-transformable site; and
   inserting the constant return value associated with the target method into a dispatch table associated with the receiver object, wherein the dispatch table includes the return constant table.

6. The computer program product of claim 1 wherein the computer process further comprises:
   evaluating the plurality of possible target methods to determine whether each possible target method is constant-returning.

7. The computer program product of claim 1 wherein the computer process further comprises:
   evaluating the plurality of possible target methods to determine whether each possible target method has at least one side effect.

8. The computer program product of claim 1 wherein the operation of generating an optimized instruction comprises:
   generating a fetching instruction programmed to retrieve via the return constant table the constant return value associated with the target method.

9. The computer program product of claim 1 wherein the operation of generating a return constant table comprises:
   evaluating the plurality of possible target methods to identify the associated constant return values; and
   storing the associated constant return values into the return constant table.

10. The computer program product of claim 1 wherein computer process further comprises:
    identifying a restricted set of one or more values of a control variable associated with a control operation;
    identifying a restricted set of one or more types associated with the restricted set of one or more values of the control variable; and
    optimizing one or more control targets associated with the control operation based on the restricted set of one or more types.

11. The computer program product of claim 1 wherein computer process further comprises:
    identifying a restricted set of one or more values associated with a control variable;
    identifying one or more target methods providing the values associated with the restricted set;
    mapping between the restricted set of values of the control variable and a restricted set of types based on the one or more target methods; and
    optimizing one or more control targets associated with the control statement based on the restricted set of types.

12. A method of optimizing indirect method calls in an object-orient program, the indirect method call being programmed to call a target method of a plurality of possible target methods, the method comprising:
    determining the association between the indirect method call and a receiver object and between the indirect method call and a target method;
    determining the association between the target method and a return constant value and between the target method and the receiver object;
    determining, at compile time and before invoking the indirect method call, the plurality of possible target methods that return constants and have no side effects;
    generating, at compile time and before invoking the indirect method call, a return constant table associated with the receiver object, the return constant table having an entry associated with the return constant value of the target method of the receiver object; and
    generating, at compile time and before invoking the indirect method call, an optimized instruction to retrieve, without executing a function, via the return constant table, the return constant value associated with the target method.

13. The method of claim 12 wherein the operation of generating a return constant table comprises:
    inserting the constant return value associated with the target method into a dispatch table associated with the receiver object, wherein the dispatch table includes the return constant table.

14. The method of claim 12 wherein the operation of generating a return constant table comprises:
    inserting the constant return value associated with the target method into a return constant table, the return constant table being independent of a dispatch table associated with the receiver object.

15. The method of claim 14 wherein the operation of generating a return constant table further comprises:
    associating the return constant table with the receiver object.

16. The method of claim 12 further comprising:
    evaluating the plurality of possible target methods to determine whether each possible target method is constant-returning.

17. The method of claim 12 further comprising:
    evaluating the plurality of possible target methods to determine whether each possible target method has at least one side effect.

18. The method of claim 12 wherein the operation of generating an optimized instruction comprises:
    generating a fetching instruction programmed to retrieve via the return constant table the constant return value associated with the target method.

19. The method of claim 12 wherein the operation of generating a return constant table comprises:
    evaluating the plurality of possible target methods to identify the associated constant return values; and
    storing the associated constant return values into the return constant table.

20. The method of claim 12 further comprising:
    identifying a restricted set of one or more values of a control variable associated with a control operation;
    identifying a restricted set of one or more types associated with the restricted set of one or more values; and optimizing one or more control targets associated with the control operation based on restricted set of one or more types.

21. The method of claim 12 further comprising:

identifying a restricted set of one or more values associated with a control variable;

identifying one or more target methods providing the values associated with the restricted set;

mapping between the restricted set of values of the control variable and a restricted set of types based on the one or more target methods; and optimizing one or more control targets associated with the control statement based on the restricted set of types.

* * * * *